(12) United States Patent
Wu (10) Patent No.: US 7,854,396 B2
(45) Date of Patent: Dec. 21, 2010

(54) SPRAYER FOR A GARDENING PURPOSE

(75) Inventor: Jui-Chang Wu, Chang Hua (TW)

(73) Assignee: SK & Y Agricultural Equipments Co., Ltd., Chang Hua (TW)

( * ) Notice: Subject to any disclaimer, the term of this patent is extended or adjusted under 35 U.S.C. 154(b) by 107 days.

(21) Appl. No.: 12/401,048

(22) Filed: Mar. 10, 2009

(65) Prior Publication Data

US 2010/0230515 A1    Sep. 16, 2010

(51) Int. Cl.
*B05B 9/08* (2006.01)
*B05B 9/04* (2006.01)

(52) U.S. Cl. .................. 239/152; 239/153; 239/373

(58) Field of Classification Search ......... 239/152–154, 239/329, 333, 373; 222/175, 385
See application file for complete search history.

(56) References Cited

U.S. PATENT DOCUMENTS

| | | | |
|---|---|---|---|
| 2,162,057 A * | 6/1939 | Brandt et al. | 239/154 |
| 2,192,256 A * | 3/1940 | Brandt | 222/245 |
| 4,651,903 A * | 3/1987 | Pagliai | 222/175 |
| 4,690,331 A * | 9/1987 | Luchsinger | 239/333 |
| 4,702,416 A * | 10/1987 | Pagliai et al. | 239/11 |
| 4,702,419 A * | 10/1987 | Luchsinger | 239/333 |
| 4,768,714 A * | 9/1988 | Luchsinger | 239/142 |
| 4,798,333 A * | 1/1989 | Luchsinger | 239/142 |
| 5,335,853 A * | 8/1994 | Wirz | 239/142 |
| 5,636,791 A * | 6/1997 | Leer | 239/142 |
| 5,671,884 A * | 9/1997 | Restive | 239/154 |
| 6,412,707 B1 * | 7/2002 | Wirz | 239/154 |

* cited by examiner

*Primary Examiner*—Darren W Gorman
(74) *Attorney, Agent, or Firm*—Alan Kamrath; Kamrath & Associates PA (57) ABSTRACT

A sprayer includes a base, a container, a drive device, a pumping device, and an outlet pipe. The drive device includes a drive shaft and a drive handle. The pumping device includes a pressure tank, a pressure release valve, a piston cylinder, a barrel, a piston, a piston rod, two guard brackets and a crank. The container is provided with a plurality of fixing plates secured in the fixing brackets of the base so that the container is combined with the base solidly and stably to enhance the strength of the sprayer. The piston rod is encompassed and protected by the barrel, and the crank is encompassed between and protected by the two guard brackets, so that the piston rod and the crank are operated exactly and stably.

20 Claims, 13 Drawing Sheets

SPRAYER FOR A GARDENING PURPOSE

BACKGROUND OF THE INVENTION

1. Field of the Invention

The present invention relates to a sprayer (or an atomizer) and, more particularly, to a sprayer that sprays liquid outwardly for a gardening purpose.

2. Description of the Related Art

A conventional sprayer comprises a base, a container, a drive device, a pumping device, and an outlet pipe. The drive device includes a drive shaft and a drive handle. The pumping device includes a pressure tank, a pressure release valve, a piston cylinder, a piston, a piston rod and a crank. However, the container is not combined with the base solidly and stably, thereby decreasing the strength of the sprayer. In addition, the piston rod and the crank of the pumping device are moved and operated frequently, so that the piston rod and the crank of the pumping device easily deviate from the central position during a long-term utilization. Further, the drive handle is mounted on the right side of the drive shaft so that the drive handle is only available for right-handed users. Further, the pressure release valve is mounted in the container that contains liquid so that a user's hand has to extend into the container to operate the pressure release valve, thereby causing danger to the user when touching the liquid that many be toxic.

BRIEF SUMMARY OF THE INVENTION

In accordance with the present invention, there is provided a sprayer, comprising a base, a container, a drive device, a pumping device, and an outlet pipe. The base has an open top provided with a protruding hollow mounting portion and a plurality of recessed fixing brackets. The container is mounted on the base and has an open bottom provided with a protruding hollow mounting section mounted in the mounting portion of the base and a plurality of fixing plates secured in the fixing brackets of the base. The drive device is mounted on the base and includes a drive shaft rotatably mounted on the base and having two opposite ends protruding outwardly from the base and a drive handle mounted on the drive shaft to drive and rotate the drive shaft relative to the base. The pumping device is mounted between the base and the container and includes a pressure tank mounted in the container and having an inside provided with a pressure chamber, a piston cylinder mounted in the pressure tank, a barrel mounted on a lower portion of the piston cylinder, a piston movably mounted in the piston cylinder, a piston rod movably mounted in the barrel and connected with the piston to move the piston relative to the piston cylinder, two guard brackets combined with each other and each mounted on the barrel, and a crank located between the two guard brackets and having a first end secured on and driven by the drive shaft of the drive device and a second end that drives and moves the piston rod relative to the piston cylinder. The outlet pipe has an end portion mounted on the pressure tank of the pumping device and connected to the pressure chamber of the pressure tank.

The primary objective of the present invention is to provide a sprayer, wherein the container is provided with a plurality of fixing plates secured in the fixing brackets of the base so that the container is combined with the base solidly and stably to enhance the strength of the sprayer.

Another objective of the present invention is to provide a sprayer, wherein the piston rod of the pumping device is encompassed and protected by the barrel, and the crank of the pumping device is encompassed between and protected by the two guard brackets, so that the piston rod and the crank of the pumping device are operated exactly and stably without deviating from the central position.

A further objective of the present invention is to provide a sprayer, wherein the drive device includes two connectors secured on the two opposite ends of the drive shaft respectively, and the drive handle of the drive device is selectively mounted on one of the two connectors to fit the requirement of right-handed and left-handed users.

A further objective of the present invention is to provide a sprayer, wherein the user can control the control knob of the control handle to release and decrease the pressure in the pressure chamber of the pressure tank automatically without having to touch the liquid that many be toxic, thereby protecting the user's safety.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-12, a sprayer in accordance with the preferred embodiment of the present invention comprises a base 20, a container 10, a drive device 30, a pumping device 40, and an outlet pipe 50.

The base 20 has an open top provided with a protruding hollow mounting portion 201 and a plurality of recessed fixing brackets 203. Each of the fixing brackets 203 of the base 20 is located outside of the mounting portion 201 and is provided with a plurality of fixing holes 204. The mounting portion 201 of the base 20 has a periphery provided with a locking groove 202. The base 20 has a side provided with a substantially T-shaped guiding groove 206 (see FIG. 6) and has two opposite ends each provided with a shaft hole 205.

The container 10 is mounted on the base 20 and has an open bottom provided with a protruding hollow mounting section 101 mounted in the mounting portion 201 of the base 20 and a plurality of fixing plates 103 secured in the fixing brackets 203 of the base 20. Each of the fixing plates 103 of the container 10 is located outside of the mounting section 101 and is provided with a plurality of fixing bores 104 aligning with the fixing holes 204 of the fixing brackets 203. The mounting section 101 of the container 10 has a periphery provided with a locking block 102 snapped into and detachably locked in the locking groove 202 of the mounting portion 201. A top cover 11 is mounted on an open top of the container 10.

The sprayer further comprises a plurality of fixing members 207 extending through the fixing holes 204 of the fixing brackets 203 and the fixing bores 104 of the fixing plates 103 to fix the fixing plates 103 of the container 10 in the fixing brackets 203 of the base 20.

The drive device 30 is mounted on the base 20 and includes a drive shaft 31 rotatably mounted on the base 20 and having two opposite ends 311 protruding outwardly from the base 20 and a drive handle 34 mounted on the drive shaft 31 to drive and rotate the drive shaft 31 relative to the base 20. The drive device 30 further includes a connector 33 secured on one of the two opposite ends 311 of the drive shaft 31 for mounting the drive handle 34, a retainer 333 secured on the other one of the two opposite ends 311 of the drive shaft 31, and two limit sleeves 32 mounted on the drive shaft 31 and abutting the connector 33 and the retainer 333 respectively. The two opposite ends 311 of the drive shaft 31 of the drive device 30 extend through and protrude outwardly from the two shaft holes 205 of the base 20. The drive shaft 31 of the drive device 30 has a mediate portion provided with at least one screw bore 310. The connector 33 of the drive device 30 is fixed on the drive shaft 31 by a locking bolt 330. The drive handle 34 of the drive device 30 is detachably mounted on the connector 33.

The pumping device 40 is mounted between the base 20 and the container 10 and includes a pressure tank 41 mounted in the container 10 and having an inside provided with a pressure chamber 410, a piston cylinder 43 mounted in the pressure tank 41, a barrel 46 mounted on a lower portion of the piston cylinder 43, a piston 44 movably mounted in the piston cylinder 43, a piston rod 45 movably mounted in the barrel 46 and connected with the piston 44 to move the piston 44 relative to the piston cylinder 43, two guard brackets 47 combined with each other and each mounted on the barrel 46, and a crank 49 located between the two guard brackets 47 and having a first end 490 secured on and driven by the drive shaft 31 of the drive device 30 and a second end 491 that drives and moves the piston rod 45 relative to the piston cylinder 43.

The pumping device 40 further includes a pressure release valve 42 mounted on the pressure tank 41 and connected to the pressure chamber 410 of the pressure tank 41, a connecting member 48 movably mounted in the barrel 46 and connected with the piston rod 45, and two linking members 482 combined with each other and pivotally mounted between the connecting member 48 and the second end 491 of the crank 49 to connect the second end 491 of the crank 49 with the piston rod 45.

The pressure tank 41 of the pumping device 40 has a lower portion provided with a plurality of inlet holes 413 each connected to the container 10. The pressure tank 41 of the pumping device 40 has a first side provided with a pressure release channel 411 connected to the pressure chamber 410 of the pressure tank 41 to receive the pressure release valve 42 and a second side provided with an outlet port 412 connected to the pressure chamber 410 of the pressure tank 41 for mounting the outlet pipe 50. The pressure release channel 411 of the pressure tank 41 has a wall provided with two upright guiding slots 4111.

The pressure release valve 42 of the pumping device 40 includes a tap, 420 movably mounted in the pressure release channel 411 of the pressure tank 41 and connected to the pressure chamber 410 of the pressure tank 41, a release pin 421 movably mounted in the two guiding slots 4111 of the pressure tank 41, an elastic member 423 mounted in the pressure release channel 411 of the pressure tank 41 and biased between the tap 420 and the release pin 421, an oblique control handle 424 rotatably mounted on the pressure tank 41 of the pumping device 40 and having a periphery provided with an upper guide track 4241 that is movable to press the release pin 421 so as to compress the elastic member 423 and a lower guide track 4242 that is movable to abut the release pin 421 so as to release the elastic member 423, and a stop seat 422 secured on a lower end 4112 of the pressure release channel 411 and abutting the control handle 424 to limit the control handle 424 between the release pin 421 and the stop seat 422. The control handle 424 of the pressure release valve 42 has an upper end provided with a protruding control knob 4243 movably mounted in and protruding outwardly from the guiding groove 206 (see FIG. 6) of the base 20.

The piston cylinder 43 of the pumping device 40 has a periphery provided with a plurality of inlet bores 431 connected to the inlet holes 413 of the pressure tank 41 respectively. The piston cylinder 43 of the pumping device 40 has an inside provided with a piston chamber 430 connected to the inlet bores 431. The lower portion of the piston cylinder 43 is provided with an upper thread 432 located under the inlet bores 431 and screwed into the lower portion of the pressure tank 41 to lock the piston cylinder 43 onto the pressure tank 41. The lower portion of the piston cylinder 43 is further provided with a lower thread 433 located under the upper thread 432. The piston cylinder 43 of the pumping device 40 has a top provided with a plurality of conducting bores 434 connected between the piston chamber 430 and the pressure chamber 410 of the pressure tank 41, and the pumping device 40 further includes a sealing disk 436 movably mounted on the top of the piston cylinder 43 and movable to seal the conducting bores 434 of the piston cylinder 43 so as to interrupt a connection between the piston chamber 430 of the piston cylinder 43 and the pressure chamber 410 of the pressure tank 41. The top of the piston cylinder 43 is provided with a protruding support post 435 to support the sealing disk 436.

The piston 44 of the pumping device 40 has an inside provided with a conduit 440 and has a top provided with a plurality of conducting holes 441 connected between the conduit 440 and the piston chamber 430 of the piston cylinder 43, and the pumping device 40 further includes a stop disk 443 movably mounted on the top of the piston 44 and movable to seal the conducting holes 441 of the piston 44 so as to interrupt a connection between the conduit 440 of the piston 44 and the piston chamber 430 of the piston cylinder 43. The top of the piston 44 is provided with a protruding support post 442 to support the stop disk 443.

The piston rod 45 of the pumping device 40 is encompassed and protected by the barrel 46. The piston rod 45 of the pumping device 40 has a periphery provided with a plurality of inlet ports 451 connected to the inlet bores 431 of the piston cylinder 43 and has an inside provided with a passage 450 connected between the inlet ports 451 and the conduit 440 of the piston 44. The piston rod 45 of the pumping device 40 has a threaded lower portion 452.

The barrel 46 of the pumping device 40 is received in the base 20 and located between the two guard brackets 47. The barrel 46 of the pumping device 40 has an upper portion provided with an inner thread 462 screwed onto the lower thread 433 of the piston cylinder 43 to lock the barrel 46 onto the piston cylinder 43. The barrel 46 of the pumping device 40 has a lower portion provided with a locking ear 463. The barrel 46 of the pumping device 40 has an inside provided with a slideway 461 to allow passage of the piston rod 45.

Each of the two guard brackets 47 of the pumping device 40 has a first end provided with a locking piece 470 locked onto the locking ear 463 of the barrel 46 and a second end provided with a shaft bore 471 to allow passage of the drive shaft 31 of the drive device 30.

The connecting member 48 of the pumping device 40 has a threaded upper portion 480 screwed onto the threaded lower portion 452 of the piston rod 45 to lock the connecting member 48 onto the piston rod 45. The connecting member 48 of the pumping device 40 has a lower portion provided with a pivot portion 481.

The crank 49 of the pumping device 40 is encompassed between and protected by the two guard brackets 47. The first end 490 of the crank 49 is provided with at least one through hole 492, and the sprayer further comprises at least one fastening bolt 60 extending through the through hole 492 of the crank 49 and screwed into the screw bore 310 of the drive shaft 31 to lock the first end 490 of the crank 49 onto the drive shaft 31.

Each of the two linking members 482 has a first end 484 pivotally connected with the pivot portion 481 of the connecting member 48 and a second end 486 pivotally connected with the second end 491 of the crank 49.

The outlet pipe 50 has an end portion mounted on the pressure tank 41 of the pumping device 40 and connected to the pressure chamber 410 of the pressure tank 41.

Figure 9:
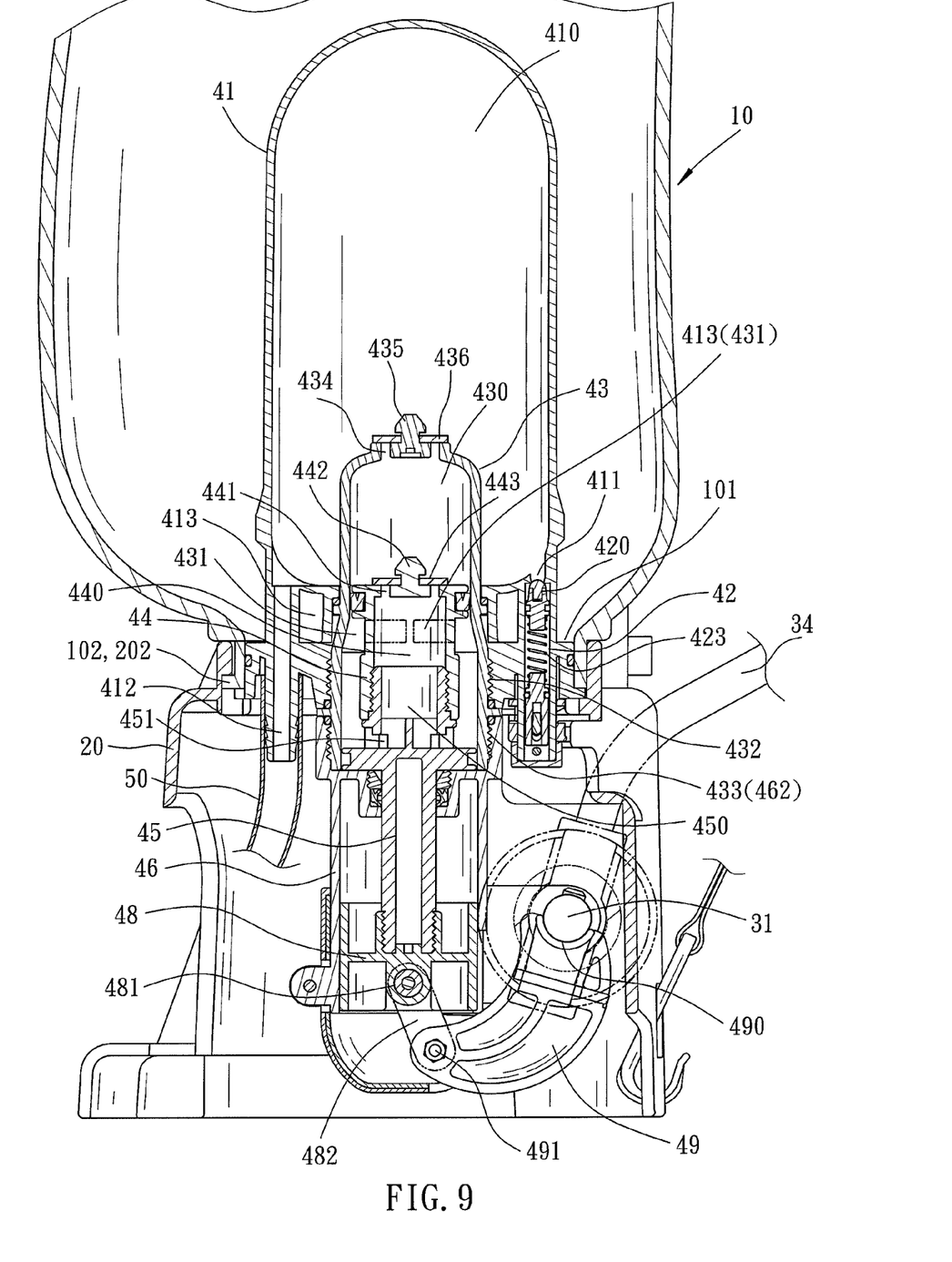
FIG. 9 is a plan cross-sectional view of the sprayer as shown in FIG. 1.
Figure 10:
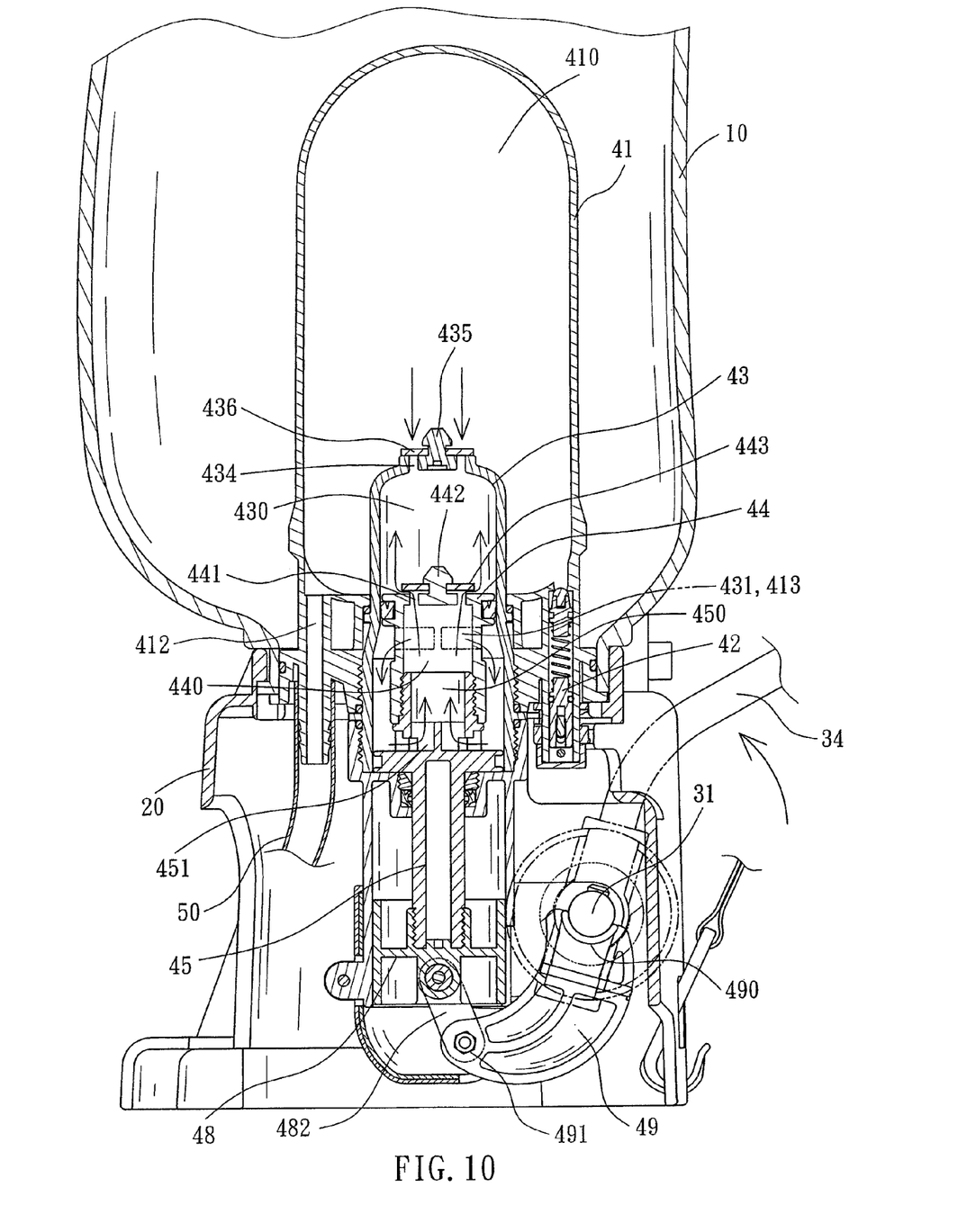
FIG. 10 is a schematic operational view of the sprayer as shown in FIG. 9.
Figure 11:
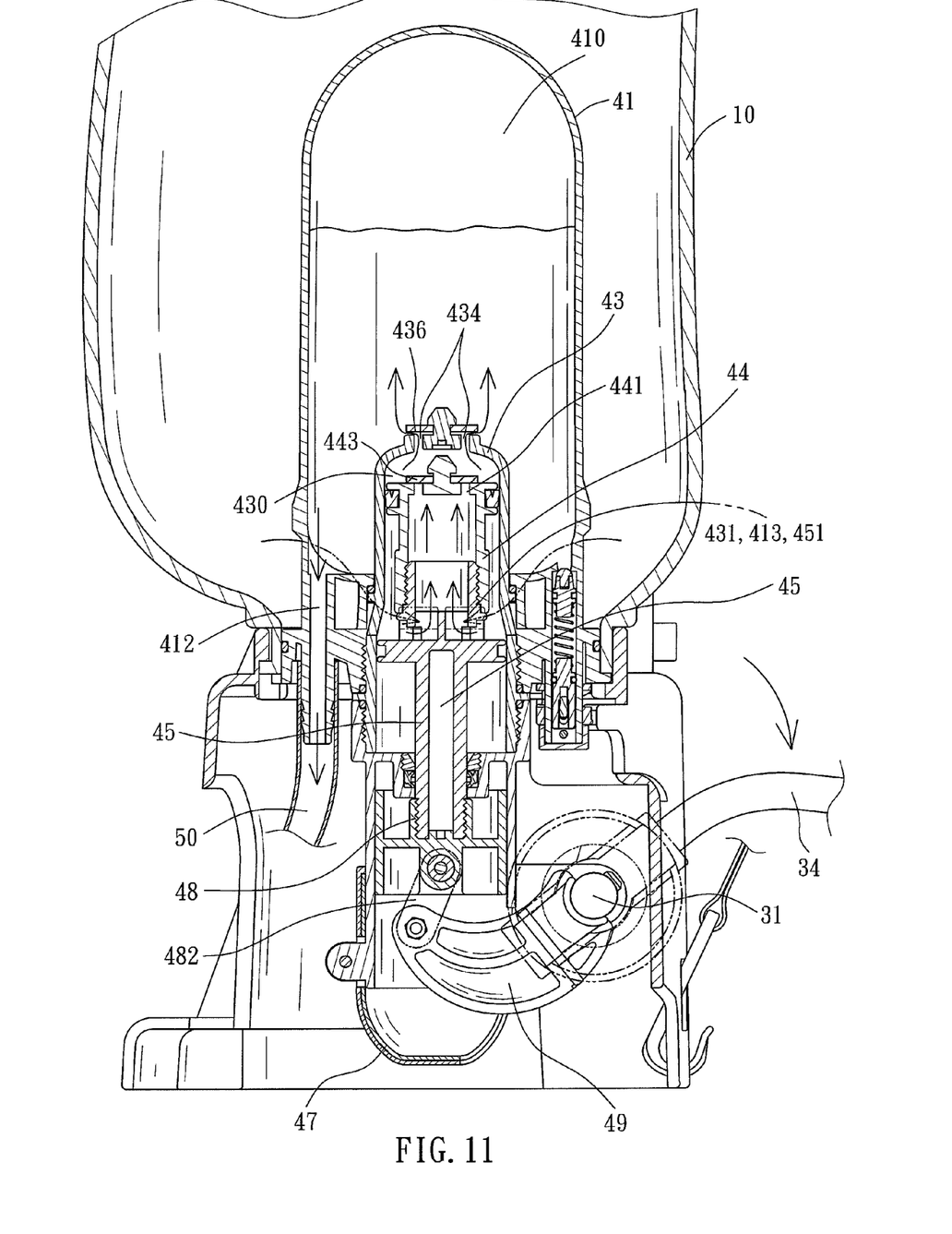
FIG. 11 is a schematic operational view of the sprayer as shown in FIG. 10.

In operation, referring to FIGS. 9-11 with reference to FIGS. 1-8, when the drive handle 34 is pulled upward from the position as shown in FIG. 9 to the position as shown in FIG. 10, the drive shaft 31 is rotated to move the crank 49 downward which moves the two linking members 482 downward which move the connecting member 48 downward which moves the piston rod 45 downward which moves the piston 44 downward. Thus, the piston 44 is moved downward in the piston cylinder 43 to compress the air in the piston 44 and to produce a thrust in the conduit 440 of the piston 44 so as to push the stop disk 443 outwardly relative to the piston 44 to detach from the conducting holes 441 of the piston 44 so as to connect the conduit 440 of the piston 44 to the piston chamber 430 of the piston cylinder 43 via the conducting holes 441 of the piston 44. At this time, the sealing disk 436 is driven downward by a suction force to seal the conducting bores 434 of the piston cylinder 43. In such a manner, a liquid in the container 10 in turn flows through the inlet holes 413 of the pressure tank 41, the inlet bores 431 of the piston cylinder 43, the inlet ports 451 of the piston rod 45, the passage 450 of the piston rod 45, the conduit 440 of the piston 44 and the conducting holes 441 of the piston 44 into the piston chamber 430 of the piston cylinder 43 as shown in FIG. 10 until the piston chamber 430 of the piston cylinder 43 is filled with the liquid.

On the contrary, when the drive handle 34 is pulled downward from the position as shown in FIG. 10 to the position as shown in FIG. 11, the drive shaft 31 is rotated to move the crank 49 upward which moves the two linking members 482 upward which move the connecting member 48 upward which moves the piston rod 45 upward which moves the piston 44 upward. Thus, the piston 44 is moved upward in the piston cylinder 43 to compress the liquid in the piston chamber 430 of the piston cylinder 43 so as to push the sealing disk 436 outwardly relative to the piston cylinder 43 and to detach the sealing disk 436 from the conducting bores 434 of the piston cylinder 43 so as to connect the piston chamber 430 of the piston cylinder 43 to the pressure chamber 410 of the pressure tank 41 via the conducting bores 434 of the piston cylinder 43. At this time, the stop disk 443 is driven downward by a suction force to seal the conducting holes 441 of the piston 44. In such a manner, the liquid in the piston chamber 430 of the piston cylinder 43 is compressed to flow through the conducting bores 434 of the piston cylinder 43 into the pressure chamber 410 of the pressure tank 41.

The above-mentioned procedures are repeated successively until the pressure chamber 410 of the pressure tank 41 is filled with the liquid. Thus, the liquid in the pressure chamber 410 of the pressure tank 41 is delivered through the outlet port 412 of the pressure tank 41 into the outlet pipe 50 and is sprayed outwardly from the outlet pipe 50 for a gardening use.

Figure 1:
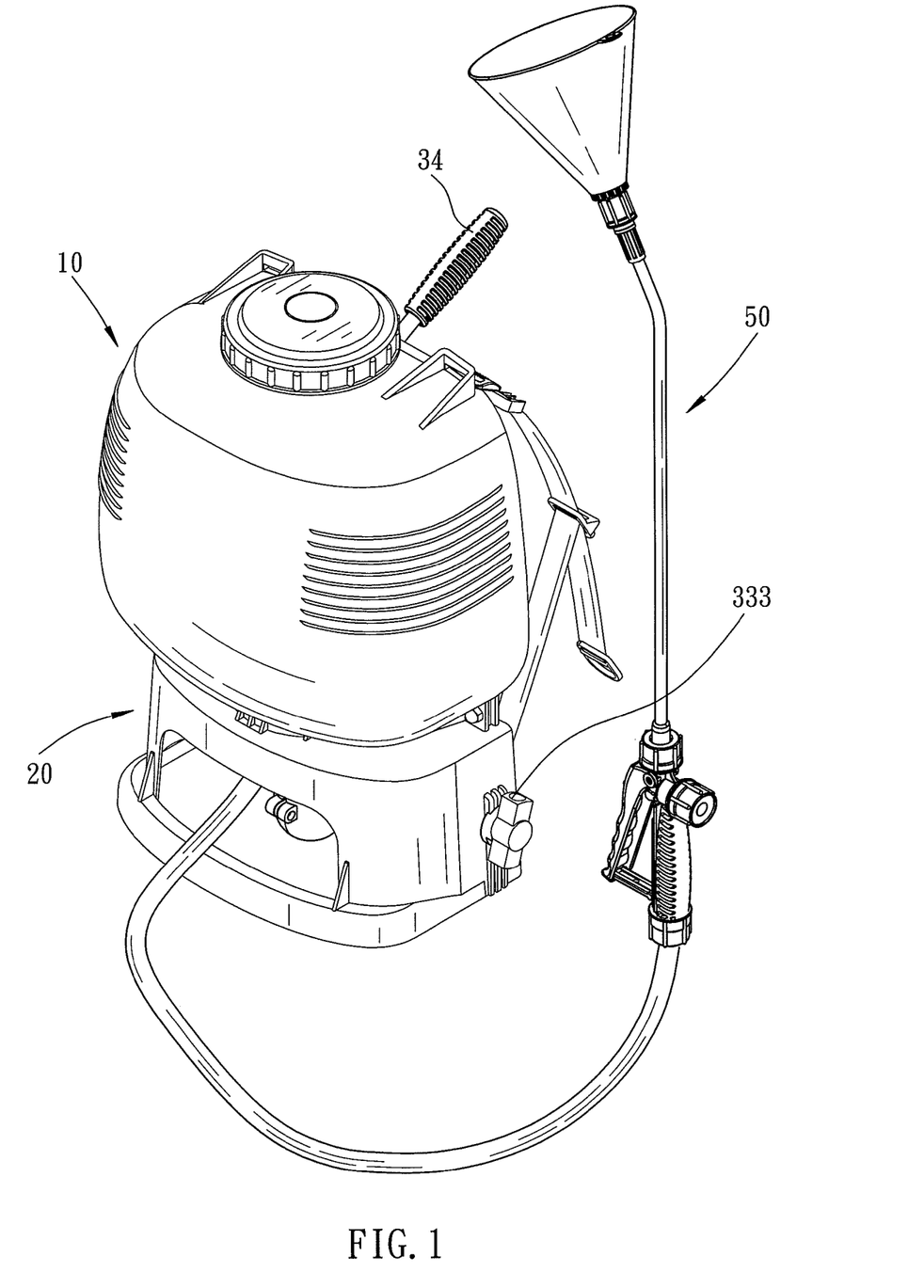
FIG. 1 is a perspective view of a sprayer in accordance with the preferred embodiment of the present invention.
Figure 2:
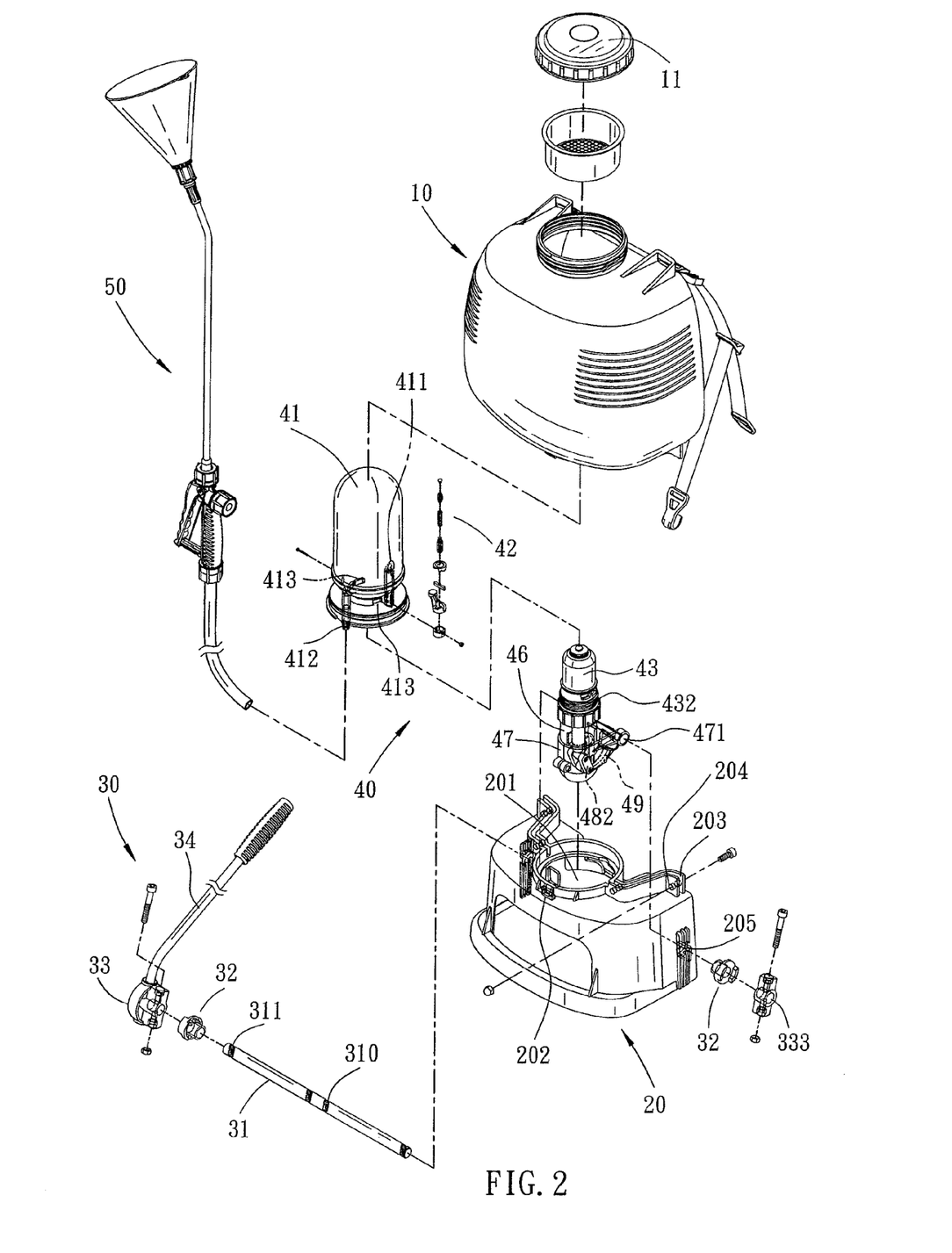
FIG. 2 is an exploded perspective view of the sprayer as shown in FIG. 1.
Figure 3:
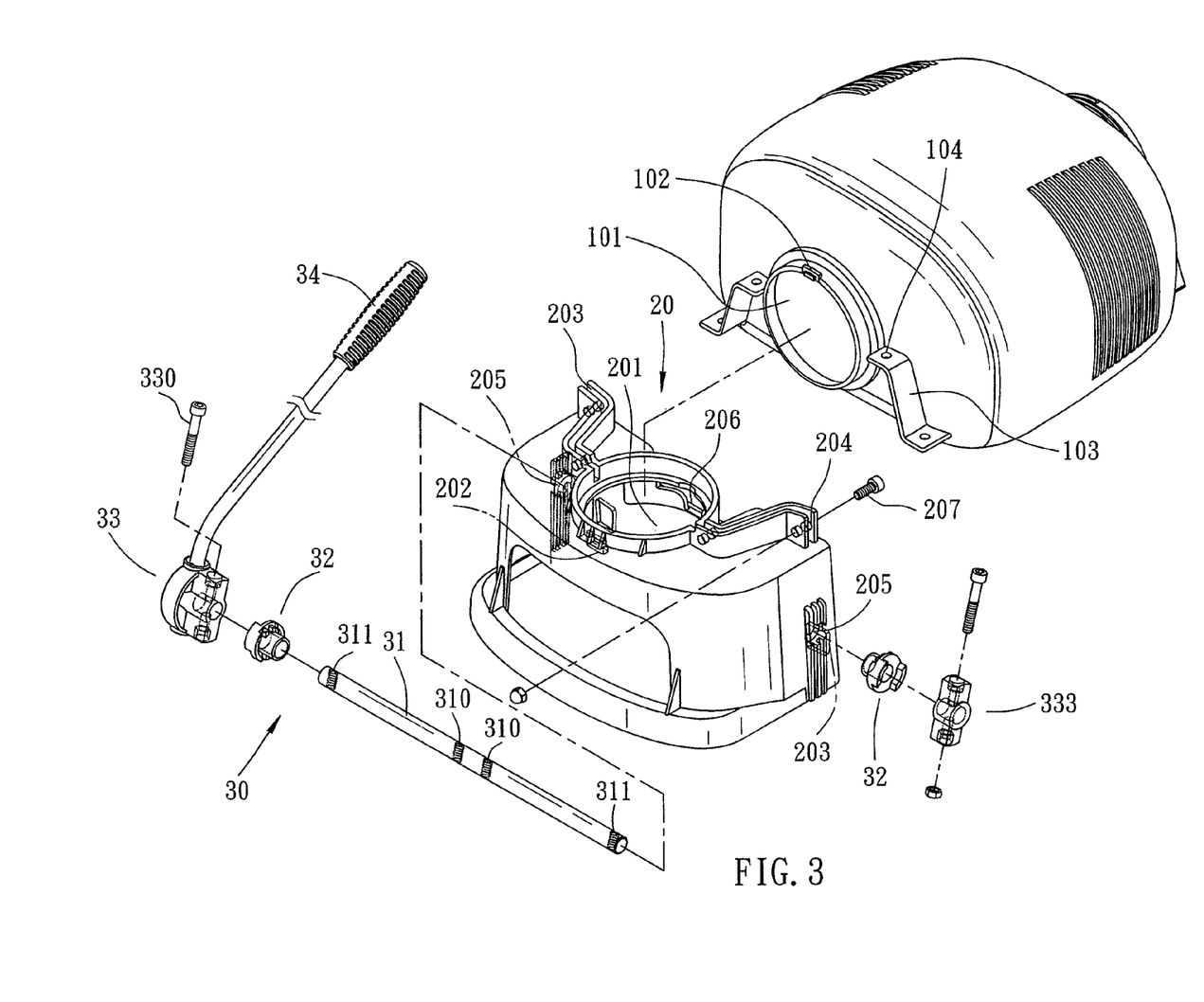
FIG. 3 is a partially exploded perspective view of the sprayer as shown in FIG. 1.
Figure 4:
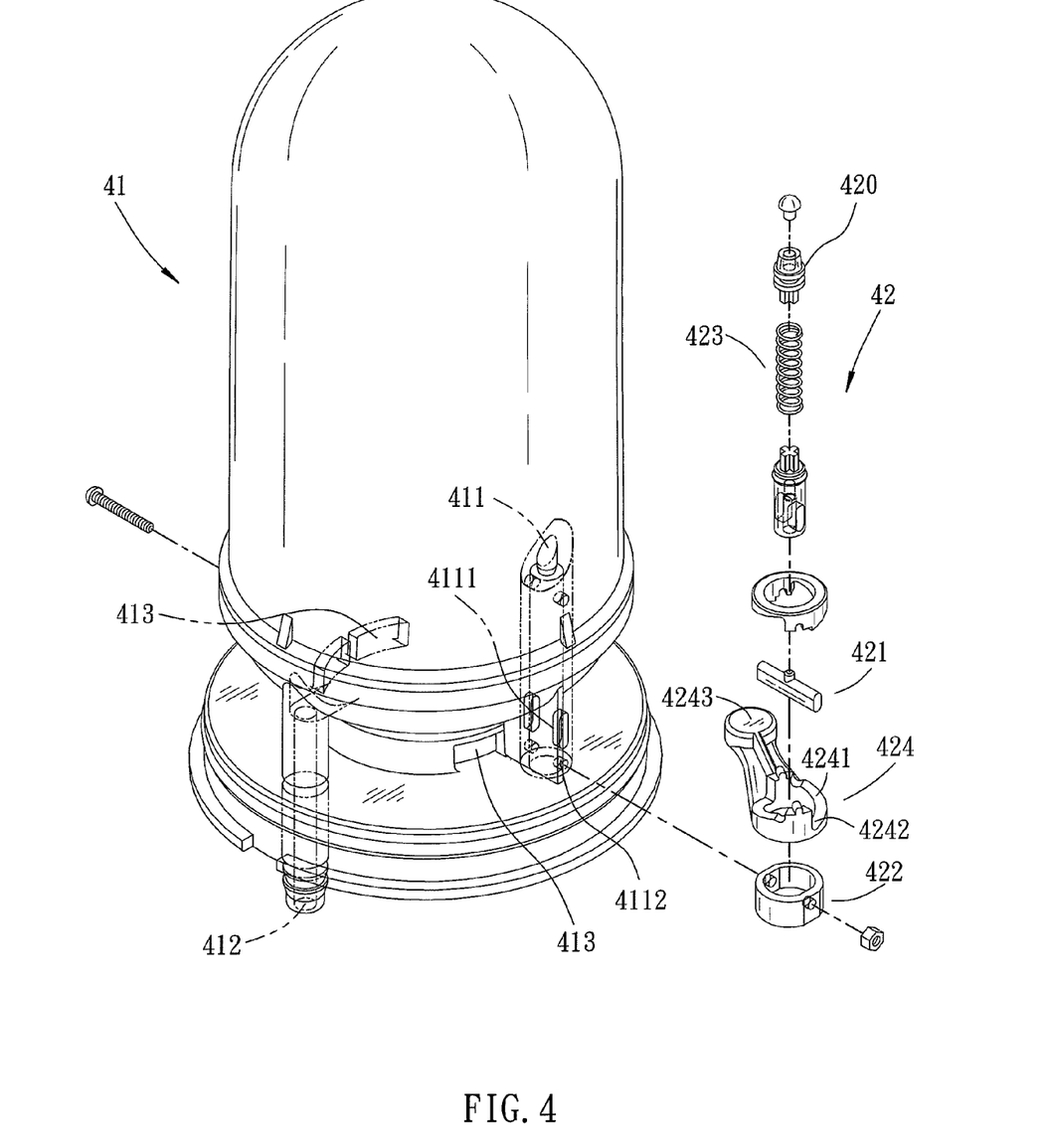
FIG. 4 is a partially exploded perspective view of the sprayer as shown in FIG. 1.
Figure 5:
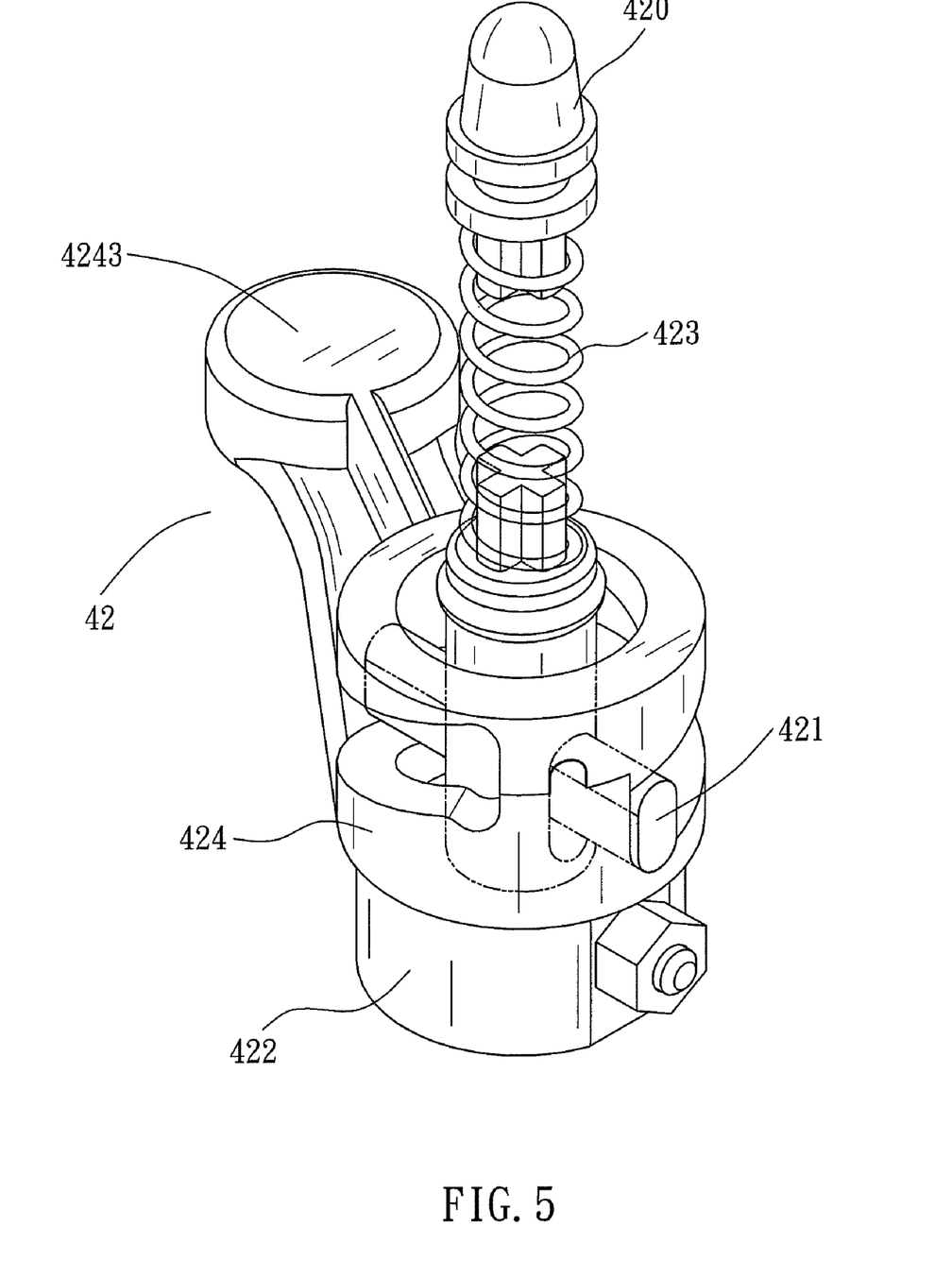
FIG. 5 is a perspective assembly view of a pressure release valve of the sprayer as shown in FIG. 4.
Figure 6:
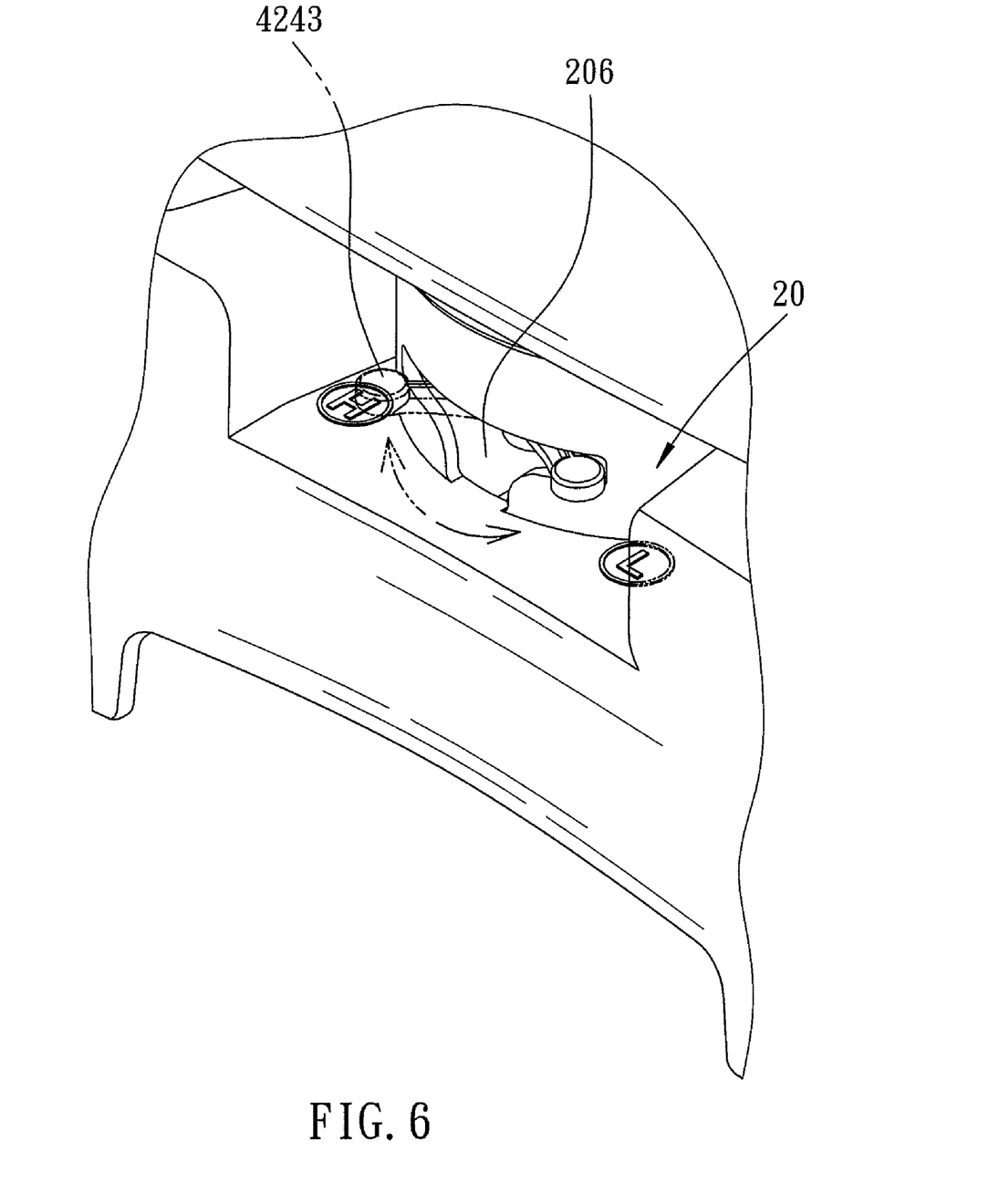
FIG. 6 is a partially perspective view of the sprayer as shown in FIG. 1.
Figure 7:
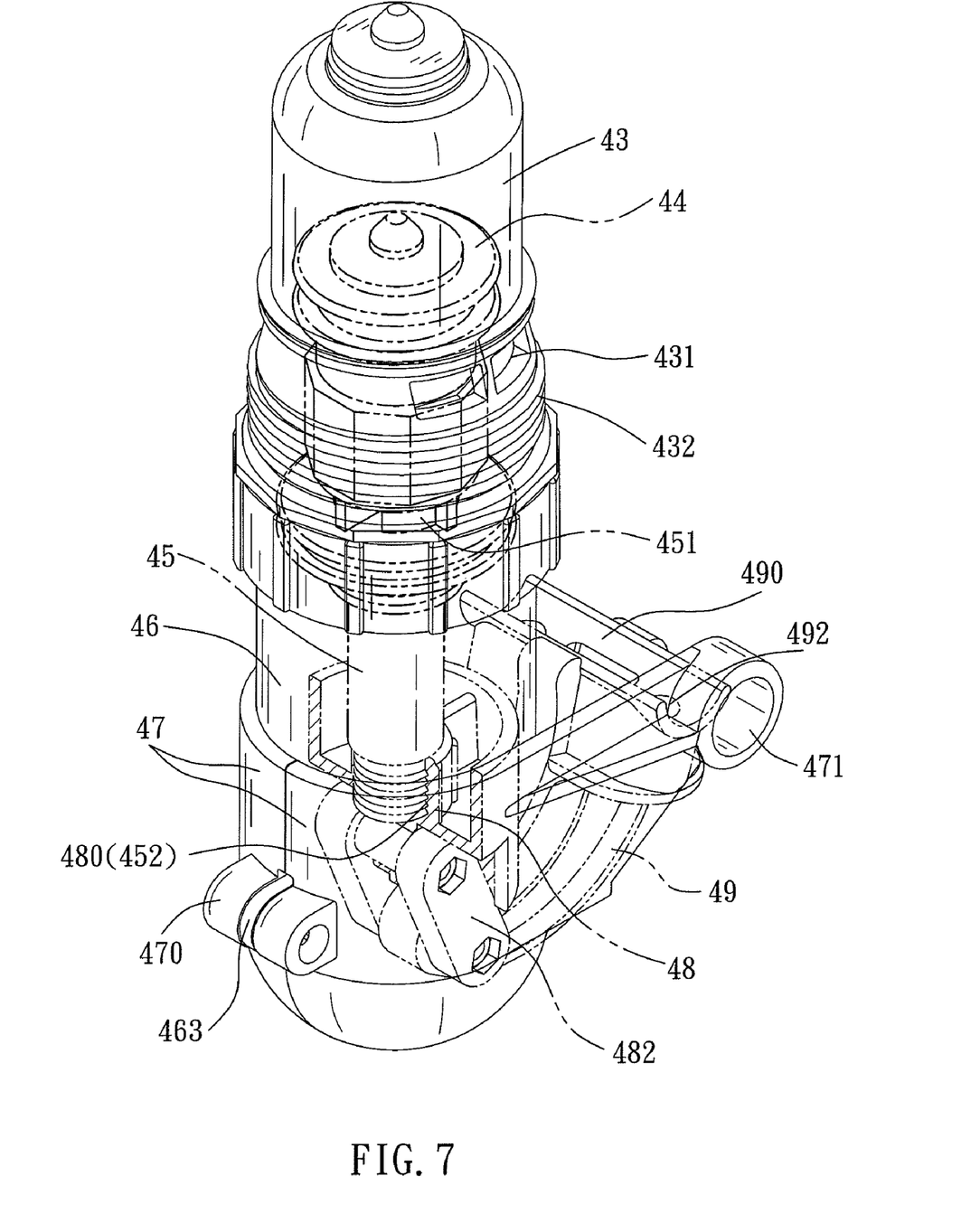
FIG. 7 is a locally enlarged perspective view of the sprayer as shown in FIG. 1.
Figure 8:
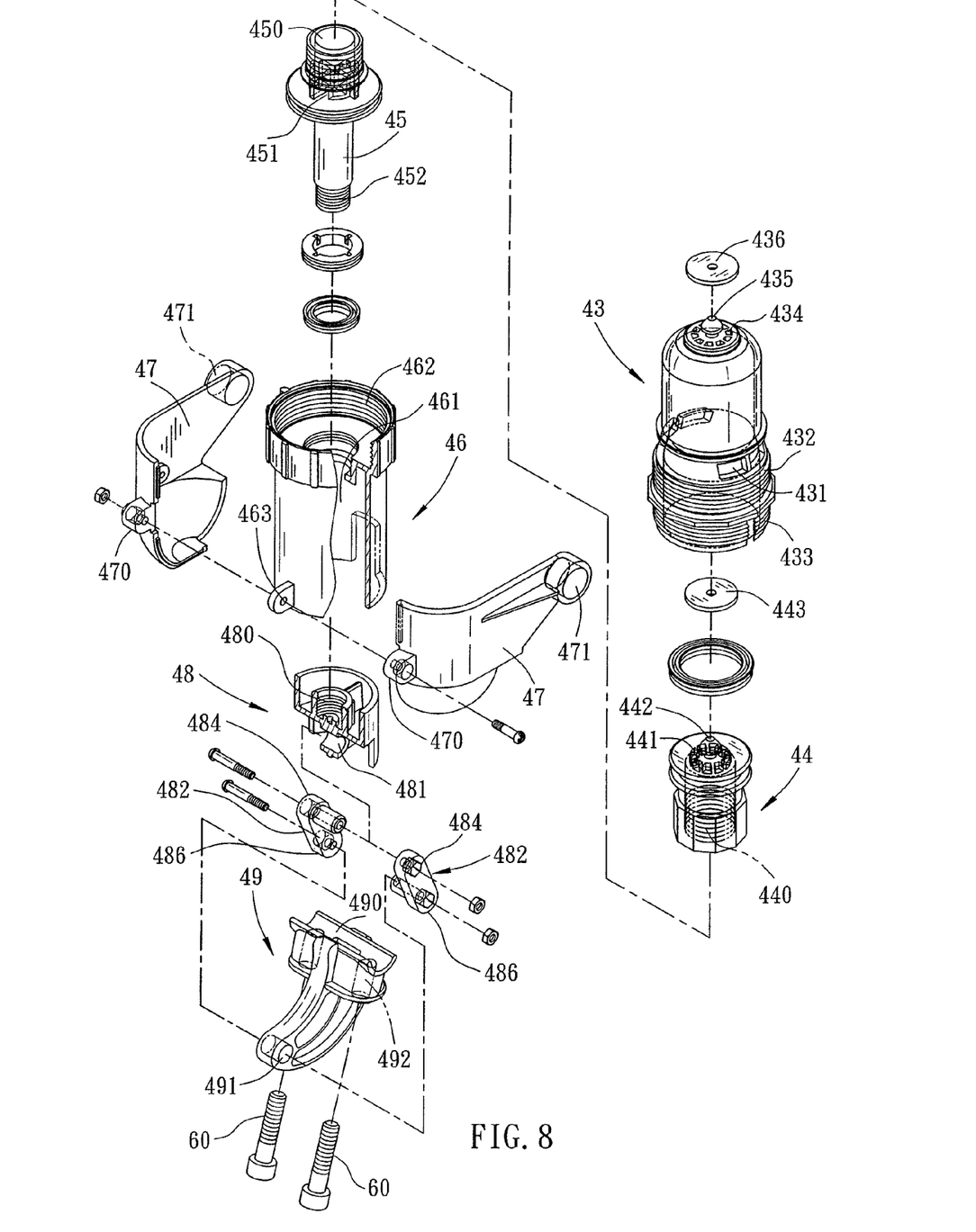
FIG. 8 is an exploded perspective view of the sprayer as shown in FIG. 7.
Figure 12:
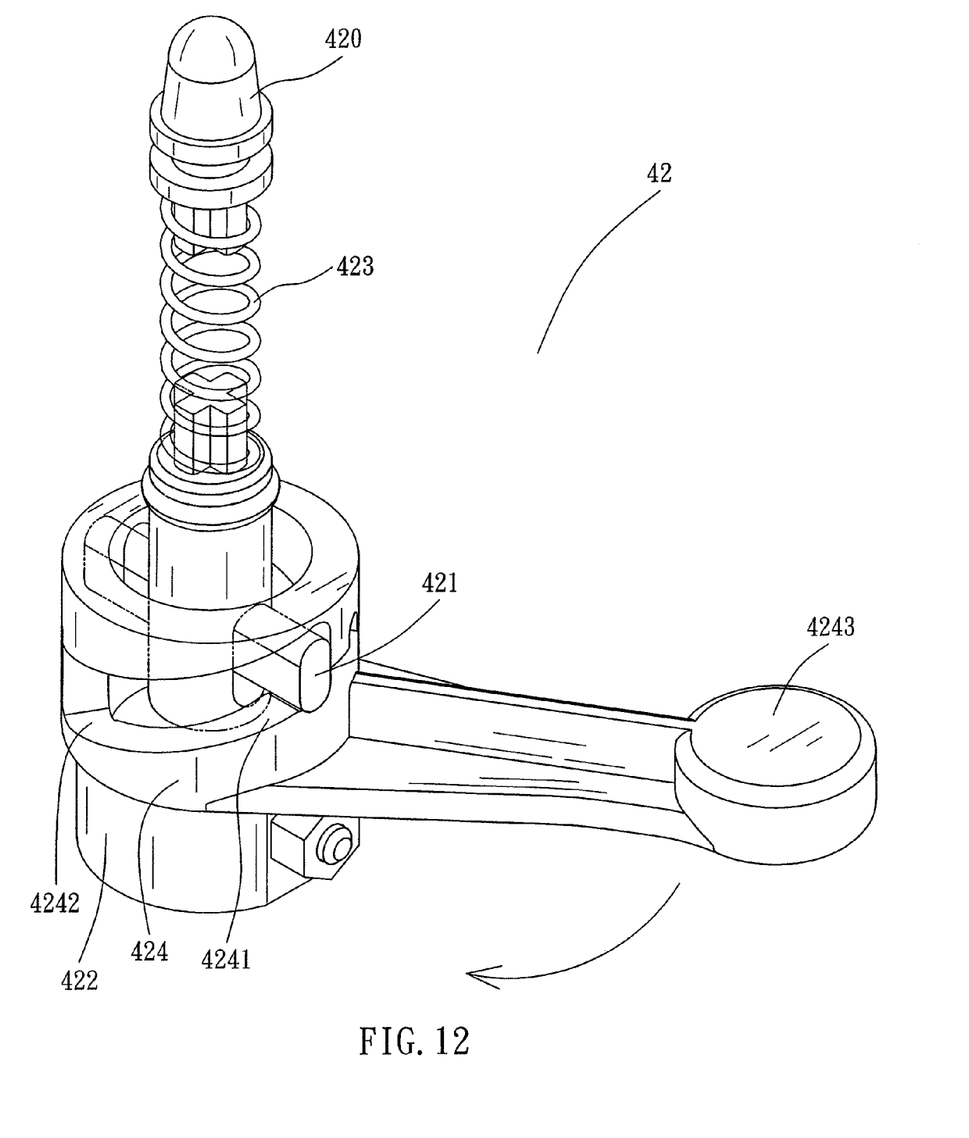
FIG. 12 is a schematic operational view of the pressure release valve of the sprayer as shown in FIG. 5.

As shown in FIGS. 5, 6 and 12, when the pressure in the pressure chamber 410 of the pressure tank 41 is too high and exceeds a predetermined value, the control knob 4243 of the control handle 424 is moved rotate the control handle 424 relative to the release pin 421 so that the lower guide track 4242 of the control handle 424 is moved to abut the release pin 421 so as to release the elastic member 423. Thus, a determined amount liquid in the pressure chamber 410 of the pressure tank 41 can be introduced into the container 10 by control of the pressure release valve 42 so as to release and control the pressure in the pressure chamber 410 of the pressure tank 41.

Figure 13:
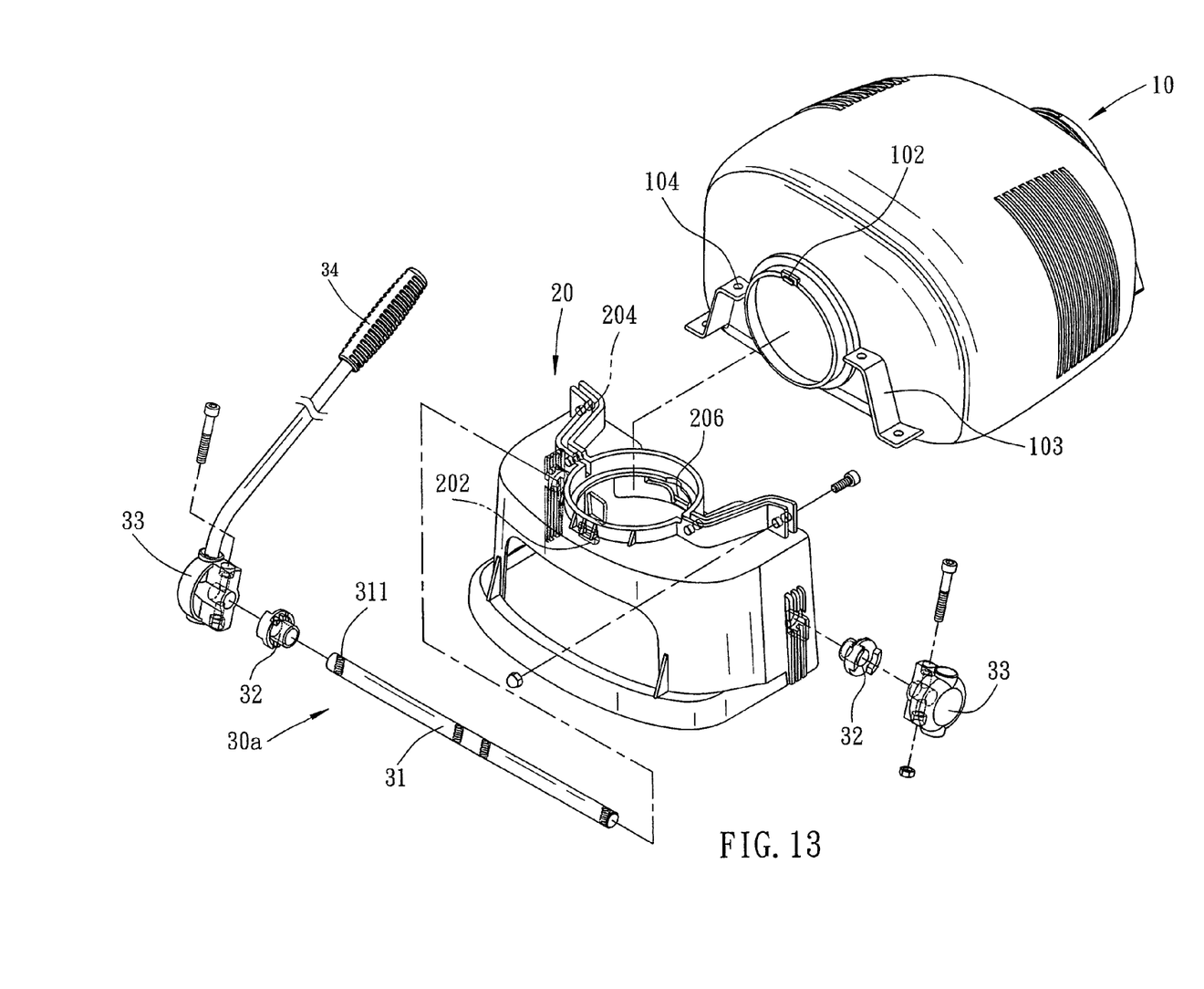
FIG. 13 is a partially exploded perspective view of a sprayer in accordance with another preferred embodiment of the present invention.

As shown in FIG. 13, the drive device 30a includes two opposite connectors 33 secured on the two opposite ends 311 of the drive shaft 31 respectively, and the drive handle 34 of the drive device 30 is selectively mounted on one of the two opposite connectors 33.

Accordingly, the container 10 is provided with a plurality of fixing plates 103 secured in the fixing brackets 203 of the base 20 so that the container 10 is combined with the base 20 solidly and stably to enhance the strength of the sprayer. In addition, the piston rod 45 of the pumping device 40 is encompassed and protected by the barrel 46, and the crank 49 of the pumping device 40 is encompassed between and protected by the two guard brackets 47, so that the piston rod 45 and the crank 49 of the pumping device 40 are operated exactly and stably without deviating from the central position. Further, the drive device 30 includes two connectors 33 secured on the two opposite ends 311 of the drive shaft 31 respectively, and the drive handle 34 of the drive device 30 is selectively mounted on one of the two connectors 33 to fit the requirement of right-handed and left-handed users. Further, the user can control the control knob 4243 of the control handle 424 to release and decrease the pressure in the pressure chamber 410 of the pressure tank 41 automatically without having to touch the liquid that many be toxic, thereby protecting the user's safety.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A sprayer, comprising a base, a container, a drive device, a pumping device, and an outlet pipe, wherein the base has an open top provided with a protruding hollow mounting portion and a plurality of recessed fixing brackets;

the container is mounted on the base and has an open bottom provided with a protruding hollow mounting section mounted in the mounting portion of the base and a plurality of fixing plates secured in the fixing brackets of the base;

the drive device is mounted on the base and includes:

a drive shaft rotatably mounted on the base and having two opposite ends protruding outwardly from the base;

a drive handle mounted on the drive shaft to drive and rotate the drive shaft relative to the base;

the pumping device is mounted between the base and the container and includes:

a pressure tank mounted in the container and having an inside provided with a pressure chamber;

a piston cylinder mounted in the pressure tank;

a barrel mounted on a lower portion of the piston cylinder;

a piston movably mounted in the piston cylinder;

a piston rod movably mounted in the barrel and connected with the piston to move the piston relative to the piston cylinder;

two guard brackets combined with each other and each mounted on the barrel;

a crank located between the two guard brackets and having a first end secured on and driven by the drive shaft of the drive device and a second end that drives and moves the piston rod relative to the piston cylinder;

the outlet pipe has an end portion mounted on the pressure tank of the pumping device and connected to the pressure chamber of the pressure tank.

2. The sprayer of claim 1, wherein each of the fixing brackets of the base is located outside of the mounting portion and is provided with a plurality of fixing holes;

each of the fixing plates of the container is located outside of the mounting section and is provided with a plurality of fixing bores aligning with the fixing holes of the fixing brackets;

the sprayer further comprises a plurality of fixing members extending through the fixing holes of the fixing brackets and the fixing bores of the fixing plates to fix the fixing plates of the container in the fixing brackets of the base.

3. The sprayer of claim 1, wherein the mounting portion of the base has a periphery provided with a locking groove;

the mounting section of the container has a periphery provided with a locking block snapped into and detachably locked in the locking groove of the mounting portion.

4. The sprayer of claim 1, wherein the base has two opposite ends each provided with a shaft hole;

the two opposite ends of the drive shaft of the drive device extend through and protrude outwardly from the two shaft holes of the base;

the drive shaft of the drive device has a mediate portion provided with at least one screw bore;

the first end of the crank is provided with at least one through hole;

the sprayer further comprises at least one fastening bolt extending through the through hole of the crank and screwed into the screw bore of the drive shaft to lock the first end of the crank onto the drive shaft.

5. The sprayer of claim 1, wherein the drive device further includes:

a connector secured on one of the two opposite ends of the drive shaft for mounting the drive handle;

a retainer secured on the other one of the two opposite ends of the drive shaft;

the drive handle of the drive device is detachably mounted on the connector.

6. The sprayer of claim 1, wherein the drive device further includes:

two opposite connectors secured on the two opposite ends of the drive shaft respectively;

the drive handle of the drive device is selectively mounted on one of the two opposite connectors.

7. The sprayer of claim 1, wherein the piston rod of the pumping device is encompassed and protected by the barrel;

the crank of the pumping device is encompassed between and protected by the two guard brackets.

8. The sprayer of claim 1, wherein the pumping device further includes:

a pressure release valve mounted on the pressure tank and connected to the pressure chamber of the pressure tank.

9. The sprayer of claim 8, wherein the pressure tank of the pumping device has a side provided with a pressure release channel connected to the pressure chamber of the pressure tank to receive the pressure release valve;

the pressure release channel of the pressure tank has a wall provided with two upright guiding slots;

the pressure release valve of the pumping device includes:

a tap movably mounted in the pressure release channel of the pressure tank and connected to the pressure chamber of the pressure tank;

a release pin movably mounted in the two guiding slots of the pressure tank;

an elastic member mounted in the pressure release channel of the pressure tank and biased between the tap and the release pin;

an oblique control handle rotatably mounted on the pressure tank of the pumping device and having a periphery provided with an upper guide track that is movable to press the release pin so as to compress the elastic member and a lower guide track that is movable to abut the release pin so as to release the elastic member;

a stop seat secured on a lower end of the pressure release channel and abutting the control handle to limit the control handle between the release pin and the stop seat.

10. The sprayer of claim 9, wherein the base has a side provided with a substantially T-shaped guiding groove;

the control handle of the pressure release valve has an upper end provided with a protruding control knob movably mounted in and protruding outwardly from the guiding groove of the base.

11. The sprayer of claim 1, wherein the pumping device further includes:

a connecting member movably mounted in the barrel and connected with the piston rod;

two linking members combined with each other and pivotally mounted between the connecting member and the second end of the crank to connect the second end of the crank with the piston rod.

12. The sprayer of claim 11, wherein the piston rod of the pumping device has a threaded lower portion;

the connecting member of the pumping device has a threaded upper portion screwed onto the threaded lower portion of the piston rod to lock the connecting member onto the piston rod;

the connecting member of the pumping device has a lower portion provided with a pivot portion;

each of the two linking members has a first end pivotally connected with the pivot portion of the connecting member and a second end pivotally connected with the second end of the crank.

13. The sprayer of claim 1, wherein the pressure tank of the pumping device has a lower portion provided with a plurality of inlet holes each connected to the container;

the piston cylinder of the pumping device has a periphery provided with a plurality of inlet bores connected to the inlet holes of the pressure tank respectively;

the piston cylinder of the pumping device has an inside provided with a piston chamber connected to the inlet bores;

the piston cylinder of the pumping device has a top provided with a plurality of conducting bores connected between the piston chamber and the pressure chamber of the pressure tank;

the pumping device further includes a sealing disk movably mounted on the top of the piston cylinder and movable to seal the conducting bores of the piston cylinder so as to interrupt a connection between the piston chamber of the piston cylinder and the pressure chamber of the pressure tank;

the piston of the pumping device has an inside provided with a conduit and has a top provided with a plurality of conducting holes connected between the conduit and the piston chamber of the piston cylinder;

the pumping device further includes a stop disk movably mounted on the top of the piston and movable to seal the conducting holes of the piston so as to interrupt a connection between the conduit of the piston and the piston chamber of the piston cylinder;

the piston rod of the pumping device has a periphery provided with a plurality of inlet ports connected to the inlet bores of the piston cylinder and has an inside provided with a passage connected between the inlet ports and the conduit of the piston.

14. The sprayer of claim 13, wherein the top of the piston cylinder is provided with a protruding support post to support the sealing disk;

the top of the piston is provided with a protruding support post to support the stop disk.

15. The sprayer of claim 13, wherein the lower portion of the piston cylinder is provided with an upper thread screwed into the lower portion of the pressure tank to lock the piston cylinder onto the pressure tank;

the lower portion of the piston cylinder is further provided with a lower thread located under the upper thread;

the barrel of the pumping device has an upper portion provided with an inner thread screwed onto the lower thread of the piston cylinder to lock the barrel onto the piston cylinder.

16. The sprayer of claim 1, wherein the barrel of the pumping device has an inside provided with a slideway to allow passage of the piston rod.

17. The sprayer of claim 1, wherein the barrel of the pumping device is received in the base and located between the two guard brackets;

the barrel of the pumping device has a lower portion provided with a locking ear;

each of the two guard brackets of the pumping device has a first end provided with a locking piece locked onto the locking ear of the barrel and a second end provided with a shaft bore to allow passage of the drive shaft of the drive device.

18. The sprayer of claim 1, wherein the pressure tank of the pumping device has a side provided with an outlet port connected to the pressure chamber of the pressure tank for mounting the outlet pipe.

19. The sprayer of claim 5, wherein the drive device further includes:

two limit sleeves mounted on the drive shaft and abutting the connector and the retainer respectively.

20. The sprayer of claim 6, wherein the drive device further includes:

two limit sleeves mounted on the drive shaft and abutting the two connectors respectively.

* * * * *